UNITED STATES PATENT OFFICE.

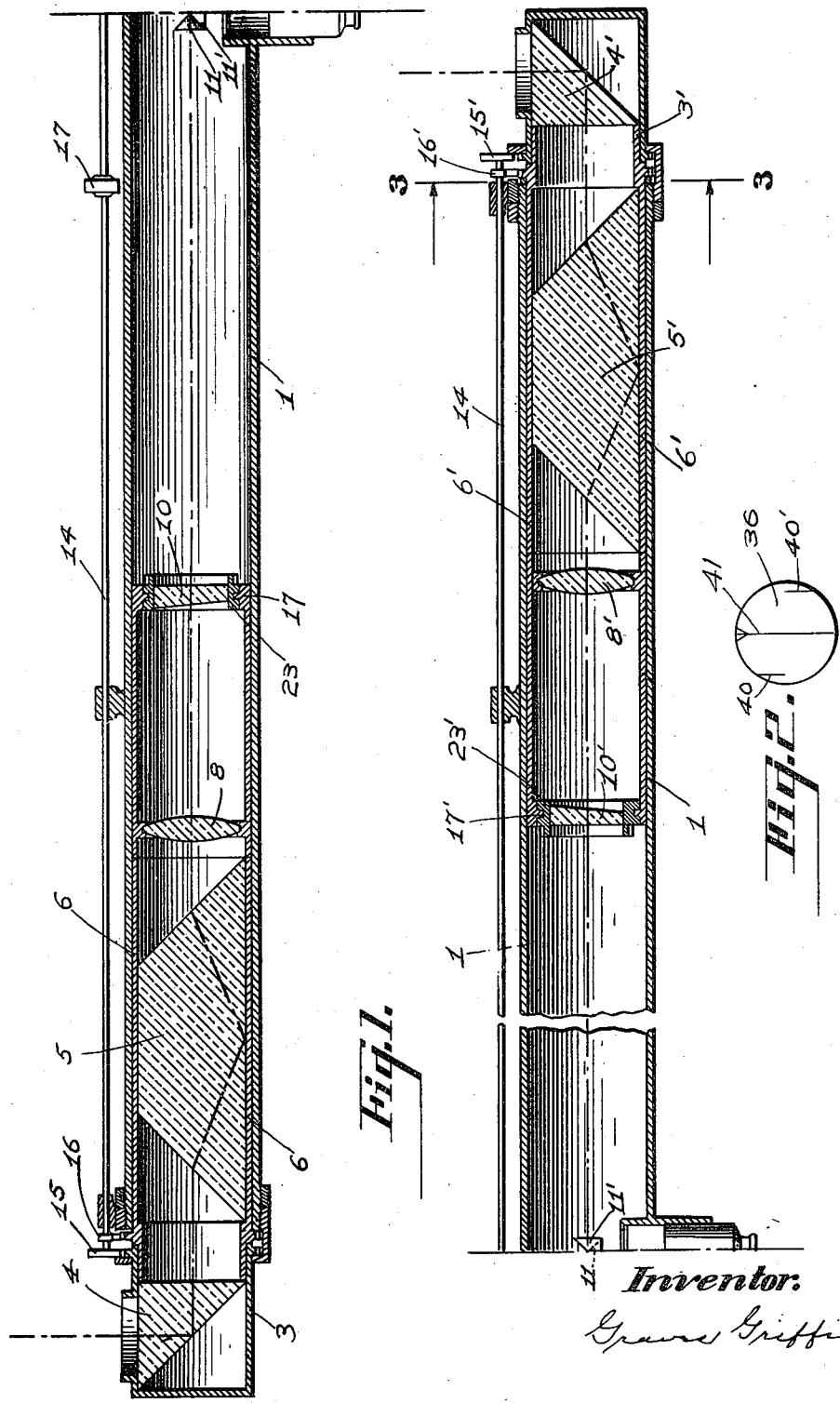

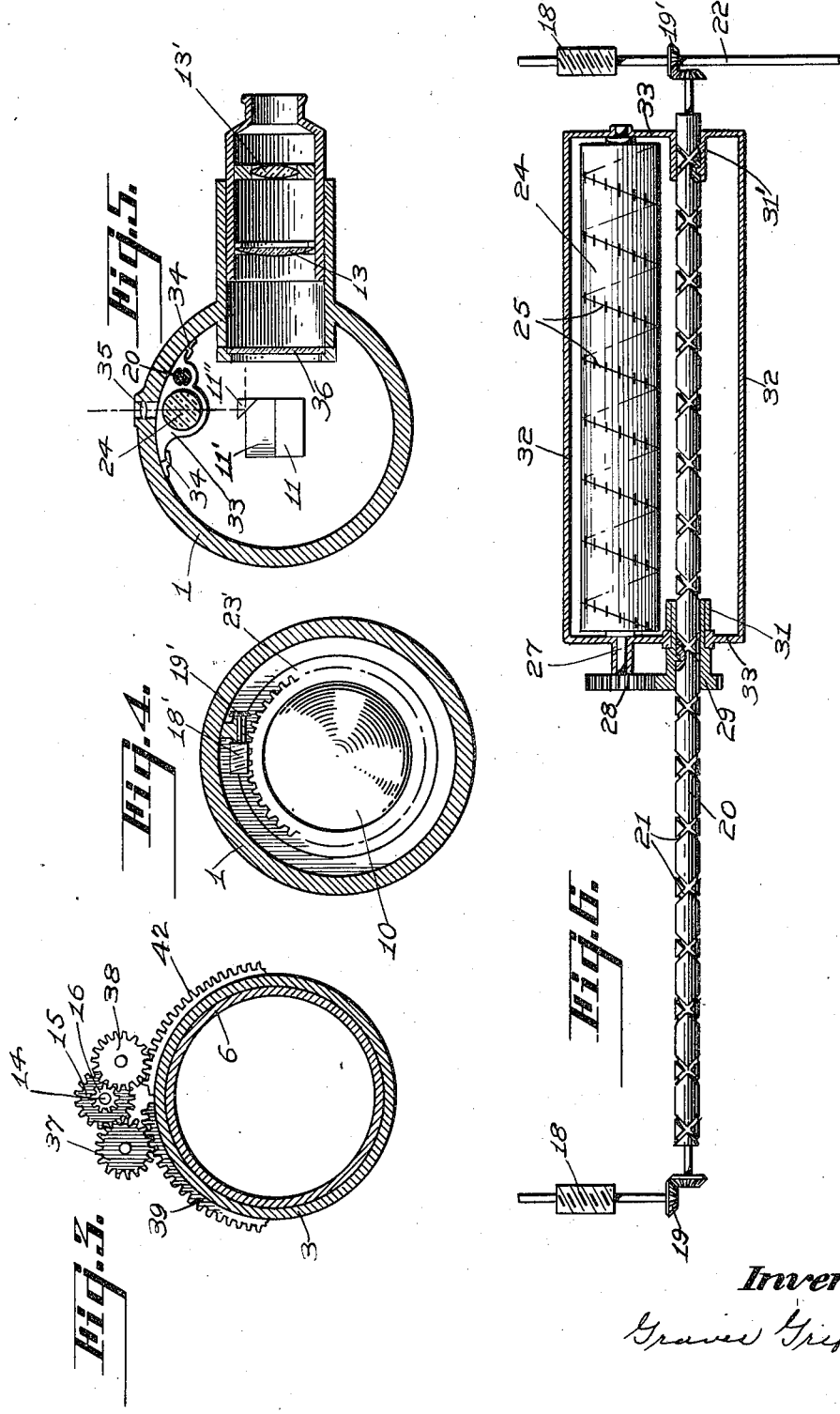

GRAVES GRIFFITH, OF SAN FRANCISCO, CALIFORNIA.

PANORAMIC RANGE-FINDER.

1,299,459.   Specification of Letters Patent.   Patented Apr. 8, 1919.

Application filed July 5, 1918. Serial No. 243,339.

*To all whom it may concern:*

Be it known that I, GRAVES GRIFFITH, a citizen of the United States, residing at San Francisco, in the county of San Francisco and State of California, have invented certain new and useful Improvements in Panoramic Range-Finders, of which the following is a full, clear, and exact specification.

The present invention relates to that particular type of range-finders having a self-contained base constant for all distances, and in which the object-angle varies with the changing distance.

As is well known, the range-finders of the type mentioned comprise two oppositely disposed telescopes having a common ocular, and refracting means confined to one of the telescopes for uniting the two images, and are intended for operation in but one plane.

A principal object of the present invention is to provide an instrument of the character named whose telescopes shall each be comprised of optical features, so arranged and actuated, as will maintain, at the eyepiece, panoramic images right side up, and the necessary refractive agencies, so arranged and actuated, as to produce either increased displacement of images or their coincidence. Hitherto, in this type of instrument, the practice has been, as stated, to have the requisite refraction for image coincidence effected between the objective and ocular of one of the telescopes, a restriction calculated to impair accuracy both as to coincidence and scale registration.

A complete embodiment of my present improvements will be found illustrated in the accompanying drawings, in which certain parts are disproportionately large in the interest of plainness. No attempt has been made therein to show housings or mountings for the optical parts, as these are matters of detail that have already been reduced to satisfactory practice.

Figure 1 is a longitudinal, horizontal section, halved as shown, the right half being broken.

Fig. 2 is a detail, in elevation, representing the image plane disk.

Fig. 3 is a transverse section on the line 3—3.

Fig. 4 is a transverse section through one of the prismatic disks 10, 10'.

Fig. 5 is a transverse section through the center of the instrument.

Fig. 6 is an elevation of the mechanism for effecting movement of the prismatic disks 10, 10' and the transparent scale-member 24.

Referring more particularly to the parts by reference characters, similar characters having reference to like parts throughout, 1 represents the tube carrying the optical systems of two oppositely disposed duplicate telescopes in co-axial alinement, and the mechanism necessary to the actuation of such parts requiring it.

Comprising respectively these telescopes are initial ray-receiving prisms 4 and 4', refracting and reflecting prisms 5 and 5', objectives 8 and 8', disk-shaped refractors 10 and 10', eyepiece prisms 11 and 11', image plane disk 36, and the common ocular lenses 13 and 13'. The optical adjuncts for scale illumination and the reflection of the scale graduations are comprised in the lens 35 and the prism 11''.

The initial ray-receiving prisms 4 and 4' are mounted in members 3 and 3' having peripheral gear-teeth 39 and 39' so secured, in connection with members 6 and 6' carrying the refracting-reflecting prisms 5 and 5' and likewise provided with peripheral gear-teeth 42 and 42', to the tube 1 as to insure co-axial alinement, while at the same time permitting rotation of these parts around the optical axis of the instrument at an angular speed for the initial ray-receiving prisms 4 and 4' double that of the refracting-reflecting prisms 5 and 5'. For effecting these several simultaneous movements in relative degree and in the same direction, properly proportioned and arranged gears, 15, 16, 37, 38 and 15', 16', 37', 38', driven by a shaft 14 having a head 17, are provided. These end mechanisms being duplications, an illustration of either serves for both.

The objectives 8 and 8' are mounted in an inner tube, separate and distinct from the members carrying the refracting-reflecting prisms 5 and 5', and at points equidistant from the centrally located prisms 11 and 11' and near the prisms 5 and 5'. Though not so shown, this tube should be continuous.

The prismatic, or refracting, disks 10 and 10' are carried in mounts 23 and 23' having annular bearings 17 and 17', and are located equally distant from their respective objectives. These prismatic disk mounts are provided with gear-systems, 23, 18, 19 and 23', 18', 19', so arranged as to rotate these parts around the optical axis of the instrument in opposite directions, through the rotation of the shaft 20. These refracting members and their driving mechanisms being duplications, an illustration of either serves for both.

The transparent spirally graduated scale-body 24 is cylindrical in form and is carried in bearings in the ends of the carrier-frame 32, 33, one of its journals 27 carrying a gear-wheel 28 in mesh with a gear-wheel 29 having a hollow shaft supported in a bearing 31. Both the hollow shaft 29 and the opposite bearing 31' carry a tooth or projection fitting respectively into the right and left spiral grooves 21, which they follow upon the rotation of the shaft 20, the one providing lateral, the other rotary movement to the scale-body 24. Guides 34 are provided to retain the slide-bars 32 in position, and a shaft 22, passing through the walls of the instrument and ending in a knurled knob, not shown, and having a crown-wheel 19', as a means for rotating the shaft 20.

The scale illumination is effected by means of light transmitted through a lens 35, the scale-body also serving as a cylindrical lens, the graduations being reflected by prism 11'' to the upper portion of 36, where it is subjected to the same degree of magnification as are the images.

It may be noted in this connection that, if it were desired that the refracting disks 10 and 10' be rotated through an entire circle, it would be necessary to graduate one-half of the scale-body 24 from zero to infinity and thence decreasing the graduations from this point again to zero, there being two points in a complete revolution at which coincidence would occur, and that a point of greatest divergence results when the bases of these refracting disks are oppositely disposed and the disks bisected by the plane in which the instrument is being operated.

The relative degree of rotation of the refracting disks 10 and 10' necessary to coincidence of images is a measure of distance and is indicated, as a scale reflection, by the index line 41.

Indices 40 and 40' are provided on the face of the transparent image-plane disk 36 as a means of aid in coincidence adjustment, though other methods of present practice may be used for the purpose. These indices are positioned relative to the position of images of an object at a known distance, say of one hundred yards. If the instrument were directed upon an object at this known distance and so adjusted that the indices 40 and 40' would bisect respectively the images, the scale reading should indicate infinity, and should further check, upon bringing the images into coincidence, by the scale reading indicating the known distance.

While a certain order of arrangement has been herein illustrated and described for the optical elements comprising the two similar and co-axially alined combinations, it is apparent that other arrangements, of certain of these elements, could be effected without departing in anywise from the spirit of this invention.

I claim:

1. In a range-finder of the character described, two similar optical systems in co-axial alinement and oppositely disposed, comprising initial ray-receiving prisms, means for the simultaneous rotation around the said co-axis, in the same direction and at equal speed, of the said initial ray-receiving prisms, refracting and reflecting prisms in coöperation respectively with the said initial ray-receiving prisms, means for the simultaneous rotation around the said co-axis, in the same direction and at equal speed, of the said refracting and reflecting prisms, the said refracting and reflecting prisms rotating in the same direction as and simultaneously with, but at half the angular speed of, the said initial ray-receiving prisms, objectives in coöperation respectively with the said refracting and reflecting prisms, refracting prisms in coöperation respectively with the said objectives, means for the simultaneous rotation around the said co-axis, in opposite directions and at equal speed, of the said refracting prisms, oppositely disposed eyepiece prisms coöperating respectively with the said refracting prisms, and an ocular system in coöperation with and common to both the said similar and co-axially alined optical systems.

2. In a range-finder of the character described, two similar optical systems in co-axial alinement and oppositely disposed, comprising initial ray-receiving prisms, means for the simultaneous rotation around the said co-axis, in the same direction and at equal speed, of the said initial ray-receiving prisms, refracting and reflecting prisms in coöperation respectively with the said initial ray-receiving prisms, means for the simultaneous rotation around the said co-axis, in the same direction and at equal speed, of the said refracting and reflecting prisms, the said refracting and reflecting prisms rotating in the same direction as and simultaneously with, but at half the angular speed of, the said initial ray-receiving prisms, objectives in coöperation respectively with the said refracting and reflecting prisms, refracting prisms in coöperation respectively with the said objectives, means for the simultaneous rotation around the said co-axis, in opposite directions and at equal speed, of the said refracting prisms, oppositely disposed eyepiece prisms coöperating respectively with the said refracting prisms, a transparent image-plane disk having thereon adjusting and scale indices, and an ocular system in coöperation with and common to both the said similar and co-axially alined optical systems.

3. In a range-finder of the character described, two similar, oppositely disposed and co-axially alined combinations of optical elements, comprising respectively an initial ray-receiving prism, an image-erecting prism, an objective, a refracting prism and an eye-piece prism, means, common to the two said combination of optical elements, for the simultaneous rotation, in the same direction and around the said co-axis, of the said initial ray-receiving prisms and the said image-erecting prisms, the angular velocity of rotation of the said initial ray-receiving prisms being double that of the said image-erecting prisms, means for the simultaneous rotation, in opposite directions and around the said co-axis, of the said refracting prisms, a scale mechanism comprising a cylindrical, transparent, spirally-graduated scale-body, a slide-frame for the support and carriage of said scale-body, guideways for the said slide-frame, and means for the simultaneous rotary and longitudinal movements of the said scale-body in correlation with the said movements of the said refracting prisms.

4. In a range-finder of the character described, two similar, oppositely disposed and co-axially alined combinations of optical elements comprising respectively an initial ray-receiving prism, an image-erecting prism, an objective, a refracting prism and an eye-piece prism, means, common to the two said combinations of optical elements, for the simultaneous rotation, in the same direction and around the said co-axis, of the said initial ray-receiving prisms and the said image-erecting prisms, the angular velocity of rotation of the said initial ray-receiving prisms being double that of the said image-erecting prisms, means for the simultaneous rotation, in opposite directions and around the said co-axis, of the said refracting prisms, a scale mechanism comprising a cylindrical, transparent, spirally-graduated scale-body, a slidable frame for the support and carriage of the said scale-body, guideways for the said slidable frame, means for the simultaneous rotary and longitudinal movements of the said scale-body in correlation with the said movements of the said refracting prisms, and means for the illumination and the reflection of the said scale-graduations.

5. In a range-finder of the character described, two similar, oppositely disposed and co-axially alined combinations of optical elements, comprising respectively an initial ray-receiving prism, an image-erecting prism, an objective, a refracting prism and an eye-piece prism, means, common to the two said combinations of optical elements, for the simultaneous rotation, in the same direction and around the said co-axis, of the said initial ray-receiving prisms and the said image-erecting prisms, the angular velocity of rotation of the said initial ray-receiving prisms being double that of the said image-erecting prisms, means for the simultaneous rotation, in opposite directions and around the said co-axis, of the said refracting prisms, a scale mechanism comprising a cylindrical, transparent, spirally-graduated scale-body, a slidable frame for the support and carriage of the said scale-body, guide-ways for the said slidable frame, means for the simultaneous rotary and longitudinal movements of the said scale-body in correlation with the said movements of the said refracting prisms, means for the illumination and the reflection of the said scale-graduations, a transparent image-plane disk having thereon adjusting indices and an index for the said reflected scale-graduations, and an ocular system common to the two said combinations of optical elements, to the said adjusting indices and to the said scale-graduation reflections.

GRAVES GRIFFITH.